(12) United States Patent
Koh

(10) Patent No.: US 11,479,335 B2
(45) Date of Patent: Oct. 25, 2022

(54) MAGNETIC PERIMETER ATTACHMENT FOR AN AIRCRAFT FLOORING SECTION

(71) Applicant: Techno-Coatings, Inc., North Miami, FL (US)

(72) Inventor: Tuan Huat Jerry Koh, North Miami, FL (US)

(73) Assignee: Techno-Coatings, Inc., North Miami, FL (US)

(*) Notice: Subject to any disclaimer, the term of this patent is extended or adjusted under 35 U.S.C. 154(b) by 148 days.

(21) Appl. No.: 16/774,942

(22) Filed: Jan. 28, 2020

(65) Prior Publication Data

US 2020/0240151 A1    Jul. 30, 2020

Related U.S. Application Data

(60) Provisional application No. 62/797,822, filed on Jan. 28, 2019.

(51) Int. Cl.
*B64C 1/18*      (2006.01)
*E04F 15/02*    (2006.01)

(52) U.S. Cl.
CPC .......... *B64C 1/18* (2013.01); *E04F 15/02027* (2013.01); *E04F 15/02044* (2013.01); *E04F 15/02144* (2013.01); *E04F 15/02155* (2013.01); *E04F 15/02016* (2013.01)

(58) Field of Classification Search
CPC ........ B64C 1/18; B64C 1/00; E04F 15/02155; E04F 13/088; E04F 13/0883; E04F 15/02027; E04F 15/02044; E04F 15/02144; E04F 15/02016
See application file for complete search history.

(56) References Cited

U.S. PATENT DOCUMENTS

| | | | |
|---|---|---|---|
| 3,353,314 A | 11/1967 | Melcher | |
| 5,046,690 A | 9/1991 | Nordstrom | |
| 5,167,087 A * | 12/1992 | Plumly | G09F 7/04 |
| | | | 40/600 |

(Continued)

FOREIGN PATENT DOCUMENTS

| | | |
|---|---|---|
| CA | 2079607 A1 | 10/1991 |
| CA | 3004249 A1 | 1/2019 |

(Continued)

OTHER PUBLICATIONS

Jan. 22, 2020—(PCT) WO and ISR—App. No. PCT/US19/854106.

(Continued)

*Primary Examiner* — Benjamin P Lee
(74) *Attorney, Agent, or Firm* — Banner & Witcoff, Ltd.

(57) ABSTRACT

A magnetic perimeter attachment for an interior space of a vehicle, such as an aircraft or other such vehicle. The vehicle flooring section includes a magnetic tape attached to the structural floor of a vehicle and a spacer panel magnetically coupled to the magnetic tape, where the spacer panel is located on the perimeter of the vehicle flooring section. The magnetic tape includes a carrier layer having an acrylic or rubber adhesive material, which is for bonding to a structural floor panel of the vehicle. The tape also includes a magnetic material deposited in the carrier layer. The magnetic material and the adhesive material are located on opposite sides of the carrier layer.

12 Claims, 9 Drawing Sheets

(56) References Cited

U.S. PATENT DOCUMENTS

| | | | |
|---|---|---|---|
| 5,205,091 A * | 4/1993 | Brown | E04F 15/024 52/126.6 |
| 5,363,579 A | 11/1994 | Plumly | |
| 5,524,373 A * | 6/1996 | Plumly | G09F 7/04 40/600 |
| 5,806,270 A | 9/1998 | Solano et al. | |
| 7,121,052 B2 | 10/2006 | Niese et al. | |
| 7,677,005 B2 | 3/2010 | Pervan | |
| 7,967,251 B2 | 6/2011 | Wood | |
| 7,988,809 B2 | 8/2011 | Smith et al. | |
| 10,836,463 B2 | 11/2020 | Mills et al. | |
| 10,927,551 B2 * | 2/2021 | Klein | E04F 13/0883 |
| 10,982,439 B2 * | 4/2021 | Childress | B64D 11/02 |
| 2002/0046527 A1 | 4/2002 | Nelson | |
| 2002/0095897 A1 | 7/2002 | Summerford | |
| 2003/0211291 A1 * | 11/2003 | Castiglione | B64D 13/00 428/172 |
| 2006/0214058 A1 | 9/2006 | Westre et al. | |
| 2007/0283654 A1 | 12/2007 | Stanchfield et al. | |
| 2008/0005993 A1 | 1/2008 | Su | |
| 2008/0014399 A1 | 1/2008 | Martin et al. | |
| 2009/0038254 A1 | 2/2009 | Steele et al. | |
| 2009/0151291 A1 | 6/2009 | Pervan | |
| 2011/0131901 A1 | 6/2011 | Pervan et al. | |
| 2013/0092793 A1 | 4/2013 | Braeutigam | |
| 2014/0033635 A1 | 2/2014 | Pervan et al. | |
| 2014/0157700 A1 | 6/2014 | Martensson | |
| 2015/0061380 A1 * | 3/2015 | Schomacker | B63B 17/00 307/9.1 |
| 2016/0060880 A1 | 3/2016 | Stover et al. | |
| 2017/0254096 A1 | 9/2017 | Pervan | |
| 2017/0297301 A1 | 10/2017 | Mills | |
| 2017/0297713 A1 | 10/2017 | Hegenbart et al. | |
| 2018/0038114 A1 | 2/2018 | Palsson | |
| 2018/0194451 A1 | 7/2018 | Cosby et al. | |
| 2018/0327074 A1 | 11/2018 | Mills et al. | |
| 2018/0355620 A1 | 12/2018 | Pervan | |
| 2019/0009882 A1 | 1/2019 | Mills et al. | |
| 2019/0055440 A1 * | 2/2019 | Roosen | E04F 15/105 |
| 2019/0177983 A1 * | 6/2019 | Klein | F16B 5/128 |
| 2019/0276133 A1 | 9/2019 | Hesslewood et al. | |
| 2019/0277041 A1 | 9/2019 | Pervan et al. | |
| 2019/0383026 A1 | 12/2019 | Bergelin et al. | |
| 2020/0001967 A1 * | 1/2020 | Pirner | B32B 7/08 |
| 2020/0018065 A1 * | 1/2020 | Childress | E04B 5/48 |
| 2020/0102063 A1 * | 4/2020 | Jerry Koh | B64C 1/18 |
| 2020/0239123 A1 | 7/2020 | Stegmiller et al. | |
| 2020/0240151 A1 | 7/2020 | Koh | |
| 2020/0331582 A1 * | 10/2020 | Hesslewood | B64C 1/18 |
| 2021/0148120 A1 * | 5/2021 | Britton | E04F 15/02038 |

FOREIGN PATENT DOCUMENTS

| | | |
|---|---|---|
| DE | 29609590 U1 | 7/1996 |
| EP | 3424812 A1 | 1/2019 |
| JP | H10183965 A | 7/1998 |
| WO | 2000020705 A1 | 4/2000 |
| WO | 2014195548 A1 | 12/2014 |
| WO | 2017197503 A1 | 11/2017 |

OTHER PUBLICATIONS

Apr. 21, 2020—(PCT) WO and ISR—App. No. PCT/US20/15475.
Apr. 27, 2020—(PCT) WO and ISR—App. No. PCT/US20/15473.
May 22, 2020—(PCT) WO and ISR—App. No. PCT/US20/15479.

* cited by examiner

MAGNETIC PERIMETER ATTACHMENT FOR AN AIRCRAFT FLOORING SECTION

CROSS REFERENCE TO RELATED APPLICATION(S)

This application claims priority to U.S. Provisional Patent Application No. 62/797,822, filed Jan. 28, 2019, and entitled "Magnetic Perimeter Attachment for an Aircraft Flooring Section," which is incorporated herein by reference in its entirety.

FIELD OF THE INVENTION

The present disclosure relates to attachments and fasteners for aircraft flooring. Particularly, the present disclosure relates to magnetic attachments for panels of aircraft flooring.

BACKGROUND OF THE INVENTION

Spacer panels in aircraft flooring refer to elements and devices used for attaching and interconnecting flooring sections generally along the perimeter where the spacer panels interface with various floorplan elements in the passenger compartment, to produce the appearance and behavior of a monolithic aircraft flooring.

BRIEF DESCRIPTION OF THE INVENTION

Aspects of the disclosure provide effective, efficient, scalable, and convenient technical solutions that address and overcome the technical problems associated with movement of underlying aircraft floor support structures. For example, the present disclosure corresponds to a magnetic perimeter attachment system for an aircraft flooring section. The illustrative magnetic perimeter attachment system includes a magnetic tape attached to the structural floor of an aircraft and a spacer panel magnetically coupled to the magnetic tape, where the spacer panel may be located on the perimeter of the aircraft flooring section. In some cases, the magnetic tape is an adhesive material including a carrier layer having an acrylic or rubber adhesive that may be bonded to the structural floor panel of the aircraft and where the adhesive material includes a magnetic material deposited in the carrier layer.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION OF THE INVENTION

In the following description of various illustrative examples, reference is made to the accompanying drawings, which form a part hereof, and in which is shown, by way of illustration, various examples in which aspects of the disclosure may be practiced. It is to be understood that other configurations may be utilized, and/or structural and functional modifications may be made, without departing from the scope of the present disclosure.

Spacer panels can be useful in combination with the panels disclosed in provisional application U.S. 62/739,818. The application discloses a floating floor attachment system that allows installation of rigid flooring product with respect to the aircraft structural floor panel via discrete floating attach points. The floating attach points allow for a specific amount of displacement and prevent permanent deformation of the floor panel. This avoids deformations of the flooring panels during the movement of underlying aircraft floor support structures, which may be caused, for example, by displacement from internal loads due to fuselage pressurization and flight maneuverers, as well as expansion and contraction due to temperature.

In some cases, a magnetic perimeter attachment for an aircraft flooring section may include a magnetic adhesive material (e.g., a magnetic tape 27) attached to a structural floor 6 of an aircraft and a spacer panel 26 magnetically coupled to the magnetic tape 27, where the spacer panel 26 may be located at the perimeter of the aircraft flooring section.

The spacer panel 26 may provide a magnetic connection between the aircraft flooring section and the structural floor 6. The magnetic tape 27 may extend longitudinally along the structural floor 6 to provide a continuous magnetic surface. This continuous magnetic surface may offer a vertical magnetic force that allows attachment of the spacer panel 26 to the structural floor 6 during a horizontal displacement, such as a horizontal displacement caused by forces generated through internal loads due to fuselage pressurization and/or through flight maneuverers. In some cases, horizontal displacement forces may be caused through expansion and contraction due to temperature, dynamic loads such as inertia, vibration, and slosh dynamics of fluids, and/or ground loads due to adverse braking or maneuvering during taxiing.

One of the advantages of the vertical magnetic force is that the vertical magnetic force may prevent the spacer panel 26 from being detached and/or may prevent raises due to forces applied by persons of objects located above the spacer panel 26, such as through shear forces or flexion forces.

Figure 1:
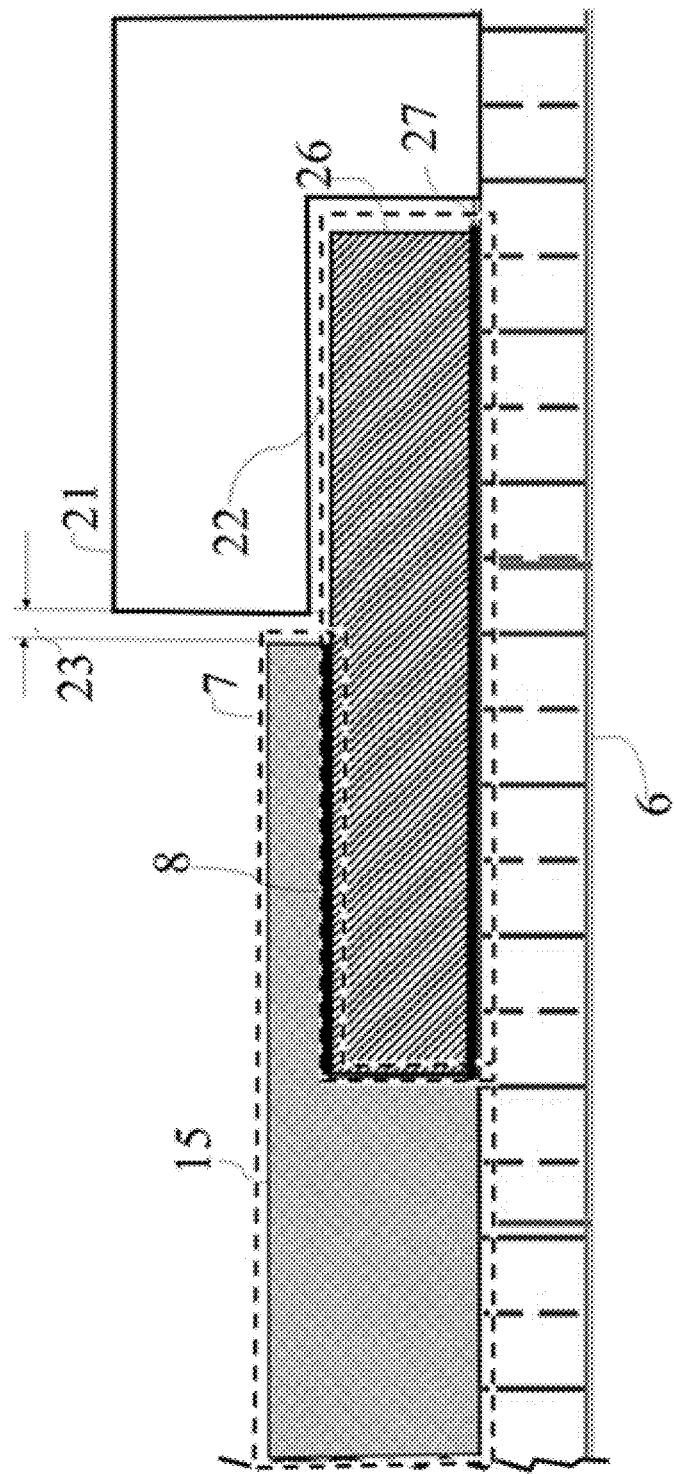
FIG. 1 corresponds to an illustrative section view of a flooring panel and a spacer panel connected to a monument of an aircraft, according to aspects of this disclosure.

For example, referring to FIG. 1, if a force is applied in the upper face 15 of a flooring panel 7 connected monolithically to the spacer panel 26, a shear and tension force may be generated. As a result, the force may produce an upward movement of an edge of the spacer panel 26, which may be located inside a recessed cavity 22 of a monument 21. Accordingly, the magnetic tape 27 keeps the spacer panel 26 attached to the structural floor 6, but allows for at least some horizontal displacement parallel to the structural floor 6.

Referring again to FIG. 1 the magnetic tape 27 may include a carrier layer having an acrylic or rubber adhesive that may be bonded to the structural floor 6 of the aircraft. The magnetic tape 27 may include a magnetic material deposited in the carrier layer. Accordingly, the carrier layer of the magnetic tape 27 may have a first face including an adhesive and a second face, opposite the first face, including the magnetic material.

Additionally, the magnetic tape 27 may include a protective backing (not illustrated) that may be located on the acrylic or rubber adhesive. The protective backing may be removed from the magnetic tape 27 when installing the magnetic tape 27 on the structural floor 6.

Figure 9:
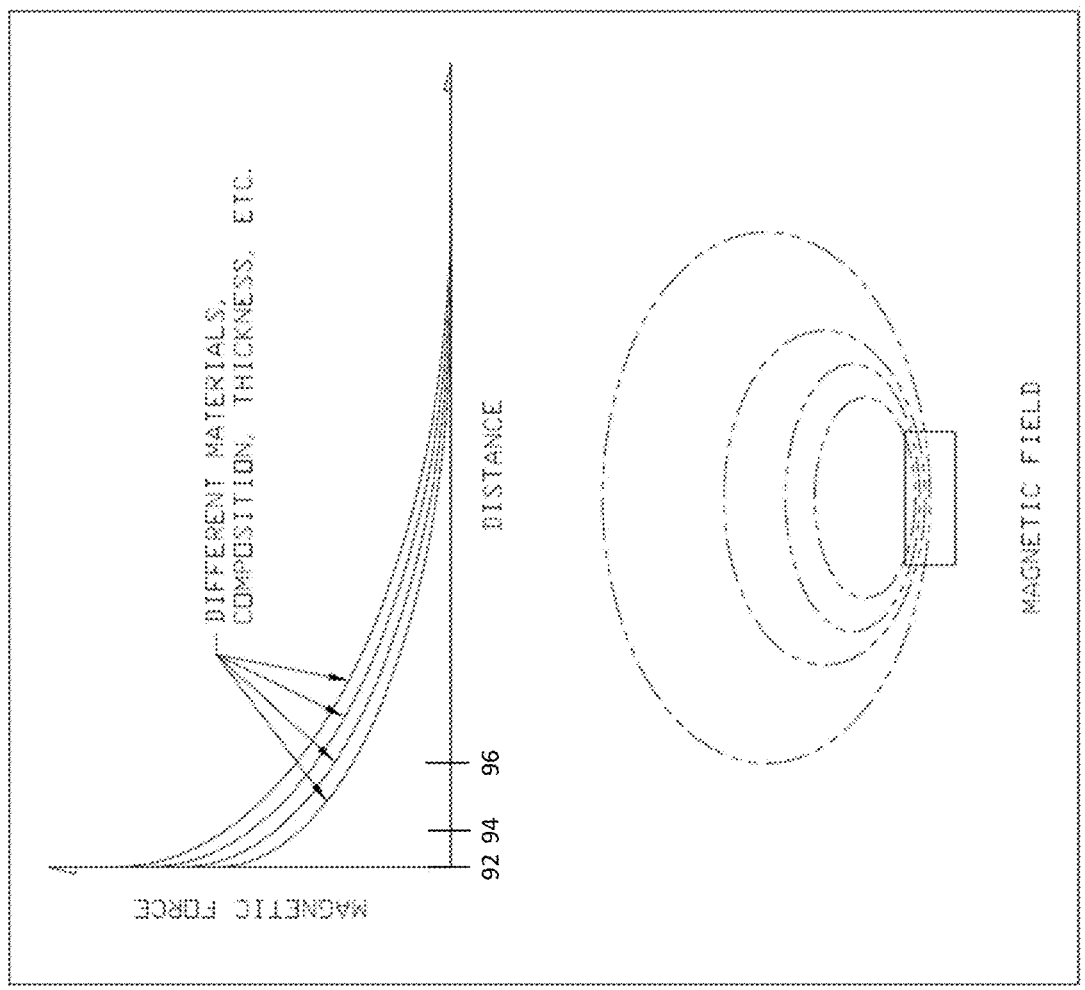
FIG. 9 shows an illustrative representation of magnetic forces generated by a magnetic field associated with a magnetic material, according to aspects of this disclosure.

In an illustrative example, the magnetic material deposited in the carrier layer may be include neodymium, ferrite, strontium ferrite, iron, and combinations thereof. The magnetic materials may provide a magnetic field strong enough to keep the spacer panel 26 attached to the structural floor 6 during turbulences or flying maneuvers. For example, FIG. 9 shows an illustrative representation of magnetic forces generated by a magnetic field associated with a magnetic material, where a magnetic material may be selected based on a characteristic of an attached element and/or an allowable distance of travel in response to an experienced external force. In some cases, the magnetic field strength required for allowing a spacer panel 26 to remain attached to the structural floor 6 of the vehicle, may be calculated based on inertial force that may be experienced by the vehicle and/or a density of the spacer panel 6. For example, a greater magnetic force may be required to retain a spacer panel 6 at least partially comprising metal than a spacer panel comprising a lighter material (e.g., wood, composite fiber, plastic, etc.).

In some cases, a required force of the magnetic field (e.g., magnetic field strength) required to retain a spacer panel 6 may depend on one or more characteristics of the spacer panel, such as size, shape, weight, and the like, an expected force that may be encountered by the installed spacer panel 6 within the enclosure (e.g., an inertial force experienced while an aircraft is under operation), and/or a specified distance of allowable movement in response to the force. For example, a formula to determine a required force (F) of the magnetic field selected to meet, or exceed, the amount of weight (W) of the supporting spacer panel multiplied by the required inertia load factor (G).

$$F=W \times G \quad (1)$$

In some cases, a minimum required factor of safety (S) may also be used. For example:

adding a safety factor (S)

$$F=W \times G+S \quad (2)$$

multiplying by the safety factor (S):

$$F=W \times G \times S \quad (3)$$

In an illustrative example, for a 10 inch (length)×2 inch (width) spacer panel 6 that has a total weight (W) of 1.2 lb, with a maximum dynamic g load requirement of 10 g (G) and using a safety factor (S) of 1.5, a calculated minimum total required magnetic force (F) is 18 lbf using formula (3):

$$F=1.2lb \times 10g \times 1.50=18lbf$$

Referring to FIG. 9, a calculation of force may be determined based on, and/or in consideration of a first distance of travel 92 (e.g., near zero movement), a second distance of travel (e.g., an amount of travel 94 comprising some movement, but remaining attached, a maximum allowable amount of travel 96, etc.).

In some cases, the magnetic tape 27 may be provided as a magnetic sheet, such as an illustrative magnetic sheet described in the U.S. Pat. No. 8,440,128. For example, the magnetic tape 27 may include magnetic materials such as $Ba_6Fe_2O_3$, $SrO_6Fe_2O_3$, $SrFe_{12}O_{19}$, non-ferrous magnetic metals, non-ferrous magnetic metal alloys, non-ferrous magnetic compounds, and/or combinations thereof.

In some cases, the spacer panel 26 may include an embedded magnetic material.

Accordingly, the spacer panel 26 may generate and/or may induce a magnetic field with the magnetic tape 27 located on the structural floor 6. For example, the embedded magnetic material can be a ferromagnetic material, a magnet, a core layer having deposited particles of magnetic materials such as neodymium, ferrite, strontium ferrite, iron, $Ba_6Fe_2O_3$, $SrO_6Fe_2O_3$, $SrFe_{12}O_{19}$, non-ferrous magnetic metals, non-ferrous magnetic metal alloys, non-ferrous magnetic compounds, and combinations thereof. In this illustrative case, the embedded magnetic material may be placed into the spacer panel 26 during the manufacturing process. For example, the spacer panel 26 may be produced through a lamination process in which the embedded magnetic material is placed among the raw material before to lamination. In some cases, the magnetic material may be included as an additional lamination layer as part of the lamination process.

In some cases, the spacer panel 26 may include a magnetic coating applied to its lower face 12. The magnetic coating may comprise suspended magnetic particles in a binder or adhesive vehicle that is applied over the lower face 12. For example, the magnetic coating may include particles of magnetic materials such as neodymium, ferrite, strontium ferrite, iron, $Ba_6Fe_2O_3$, $SrO_6Fe_2O_3$, $SrFe_{12}O_{19}$, non-ferrous magnetic metals, non-ferrous magnetic metal alloys, non-ferrous magnetic compounds, and combinations thereof.

Figure 2:
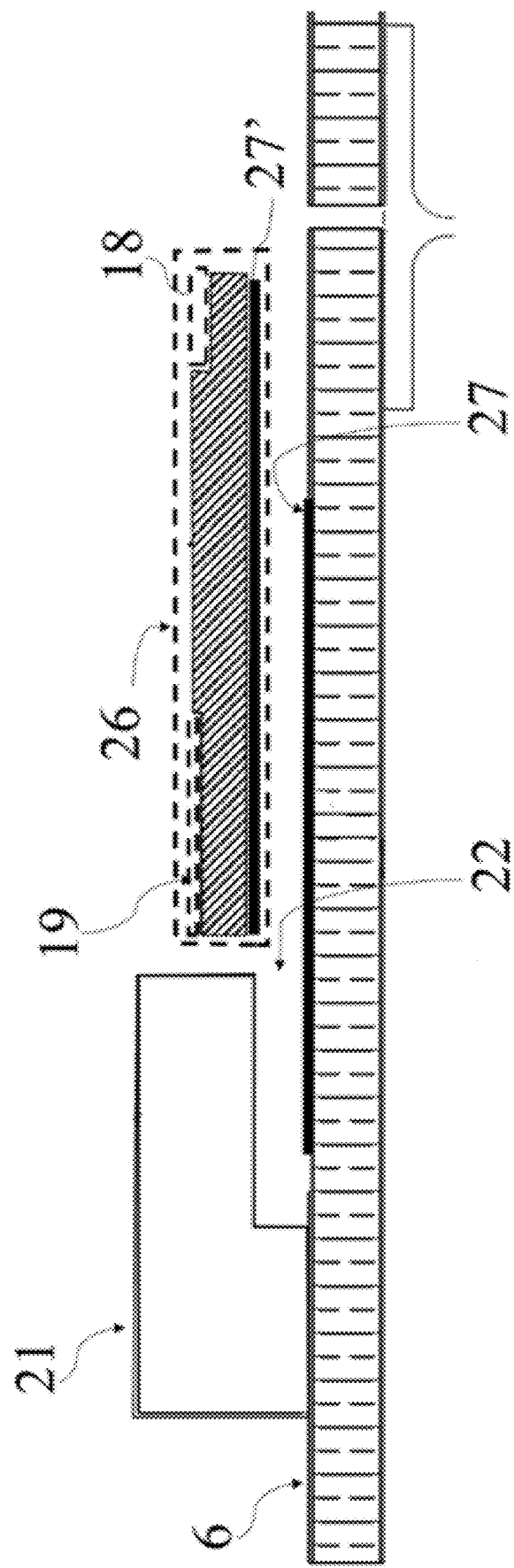
FIG. 2 corresponds to an illustrative section view of an exploded view of a spacer panel connected to a monument of an aircraft by magnetic tapes, according to aspects of this disclosure.

In some cases, referring to FIG. 2, an illustrative magnetic perimeter attachment may include a magnetic tape 27 attached to the structural floor 6 and a complementary magnetic tape 27' attached to a lower face 12 of the spacer panel 26.

It would be understood that a complementary magnetic tape 27' may be a magnetic tape that is magnetically coupled with the magnetic tape 27 located on the structural floor 6. The magnetic tapes 27 and 27' have opposed magnetic charges to attract the magnetic tapes 27 and 27' to each other.

In some cases, the magnetic tapes 27 and 27' are made of the same materials and/or composition.

For example, the magnetic tapes 27 and 27' may be applied to the spacer panel 26 and the structural floor 6, respectively and forming patterns and/or strips. The patterns and/or strips may be configured and designed while taking into account the shape of the edges of the structural floor 6 and the number of monuments 21 that are installed in the aircraft.

Figure 6:
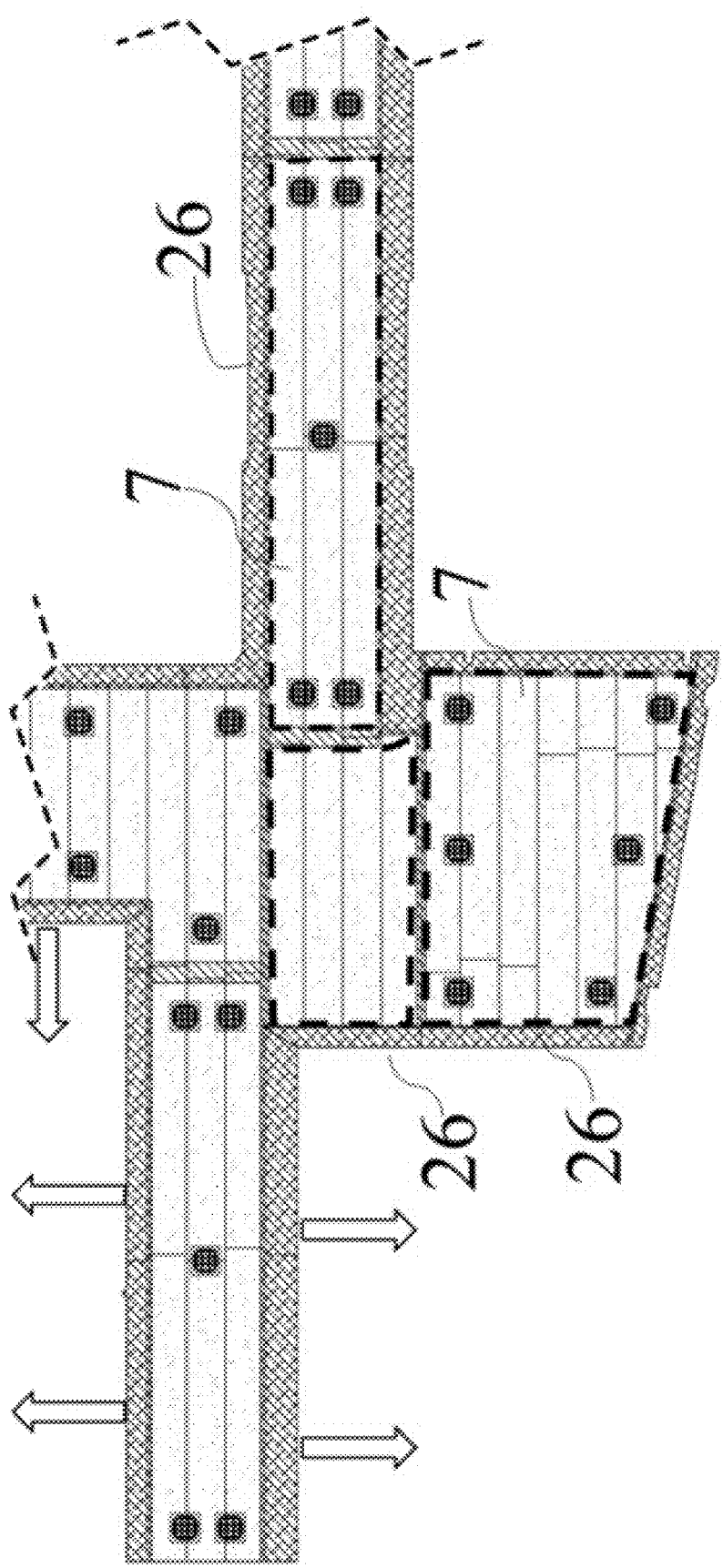
FIG. 6 corresponds to an illustrative bottom view of an installation showing spacer panels located on the periphery of an aircraft flooring, according to aspects of this disclosure.

Accordingly, the patterns and/or strips may be designed to maintain a magnetic force between the spacer panel 26 and the structural floor 6 when the spacer panel 26 experiences horizontal displacements caused by forces generated by internal loads due to fuselage pressurization and flight maneuverers, as well as expansion and contraction due to temperature as illustrated in FIG. 6.

One of the advantages of this configuration is that the structural floor 6 and the spacer panel 26 can be made of non-magnetic materials, such as polymers, magnesium, aluminum or titanium alloys and/or composites based on glass, aramid or carbon fibers, which typically have lesser density than magnetic materials such as magnetic metals.

Additionally, the magnetic tapes 27 and 27' can be removed and replaced during maintenance labors without damaging the structural floor 6 and/or the spacer panel 26.

Figure 3:
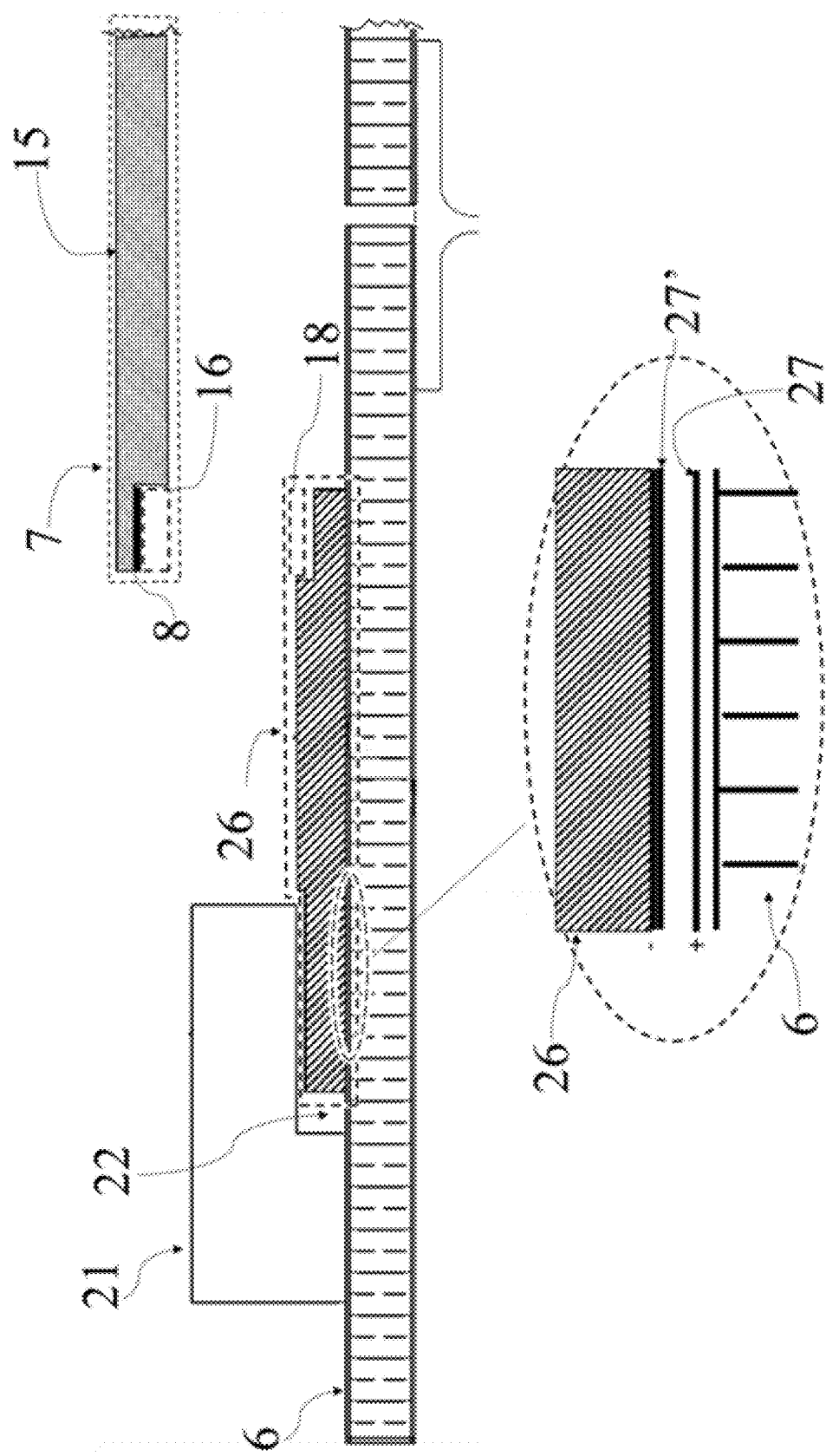
FIG. 3 corresponds to an illustrative section view showing an exploded view of a spacer panel connected to a monument of an aircraft by magnetic tapes and a flooring panel connected to the spacer panel by an adhesive material, according to aspects of this disclosure.

In some cases, making reference to FIG. 2 and FIG. 3, the spacer panel 26 may include in its upper face 11 a first cut section 19 located on an edge contiguous to a monument 21 located on the perimeter of the aircraft flooring section. In some cases, the first cut section 19 may be inserted into a recessed cavity 22 of the monument 21.

At times, the total thickness of the spacer panel 26 may be thicker than the size of the recessed cavity 22 of the monuments 21. Therefore, to go under the monument 21 and to avoid a visible gap, the top of the upper face 11 of the spacer panel 26 may be removed locally during the installation of the spacer panel 26 into the recessed cavity 22. The removal of material to form the first cut section 19 of the spacer panel 26 may be accomplished using a power planer or/or through additional trimming and reinforcement of the spacer panel 26. In some cases, the first cut section 19 may be formed during the manufacturing process of the spacer panel 26. In some cases, the first cut section 19 may provide a thickness to the spacer panel 26 in the edge inserted into the recessed cavity 22. This thickness of the spacer panel 26 may allow for enough tolerance to permit horizontal displacements of the spacer panel 26 when caused by forces generated by internal loads due to fuselage pressurization and/or flight maneuverers, by expansion and contraction due to temperature or dynamic loads such as inertia, vibration, slosh dynamics of fluids, and by ground loads due to adverse braking or maneuvering during taxiing.

In some cases, a sealant material or a gasket may be deposited between the monument 21 and the spacer panel 26. Accordingly, the sealant material or gasket prevents infiltrations of liquids spilled over the spacer panel 26.

In some cases, with reference to FIG. 3, the spacer panel 26 may include a second cut section 18 located on an edge contiguous to a flooring panel 7. The flooring panel 7 may include a cut section 16, which may be in contact with the second cut section 18 of the spacer panel 26 and forming a male-female connection.

In some cases, the second cut section 18 may be connected to the flooring panel 7 by an adhesive material 8. The adhesive material 8 may allow for a quick installation of the flooring panel 7 and the spacer panel 26 by using low-weight materials in comparison to mechanical fasteners.

The adhesive material 8 may be selected from suitable adhesive materials such as, for example, silicone adhesives, polymer adhesives, acrylonitrile, acrylic adhesives, cyanoacrylates, epoxy resins, epoxy putty, ethylene-vinyl acetate (EVA), polyvinyl butyral (PVB), polyvinyl acetate (PVA), polyester resins, polysulfides, polyurethane, polyvinyl alcohol, polyvinyl chloride (PVC), polyurethane tapes, butyl rubber tapes, neoprene adhesives, urethane adhesives, and/or combinations thereof.

In some cases, the adhesive material 8 may be a butyl rubber tape having adhesive on both faces. For example, the adhesive may be deposited on a polyethylene backing. Additionally, each face of the tape may be protected by a backing layer that is removed during installation of the adhesive material 8 to the flooring panel 7 and the spacer panel 26.

In some cases, not illustrated, the spacer panel 26 and the flooring panel 7 may be connected by one or more mechanical fasteners. For example, the spacer panel 26 and the flooring panel 7 may be connected by one or more mechanical fasteners, such as bolts, screws, bolts, nuts, rivets, studs, pins, wedges, clamps, equivalent elements which are known by a skilled artisan, and combinations thereof.

Referring to FIGS. 5A-D, the flooring panel 7 may have a cut section 16 with different forms or shapes, such as rectangles, triangles, trapezoids, or trapezoids with curve edges. In some non-illustrated examples, the flooring panels 7 may have a cut section 16 having a form or shape such as a hexagon, pentagon, octagon, triangle, parallelogram, or any other regular or irregular polygon.

Similarly, and referring to FIGS. 5A-D, the spacer panel 26 may have a form that fits the form of the cut section 16 of the flooring panel 7. For example, the spacer panel 26 may have a form or shape such as rectangles, triangles, trapezoids, or trapezoids with curve edges. In other non-illustrated examples, the spacer panel 26 may have a form or shape such as a hexagon, pentagon, octagon, triangle, parallelogram, or any other regular or irregular polygon.

Figure 4:
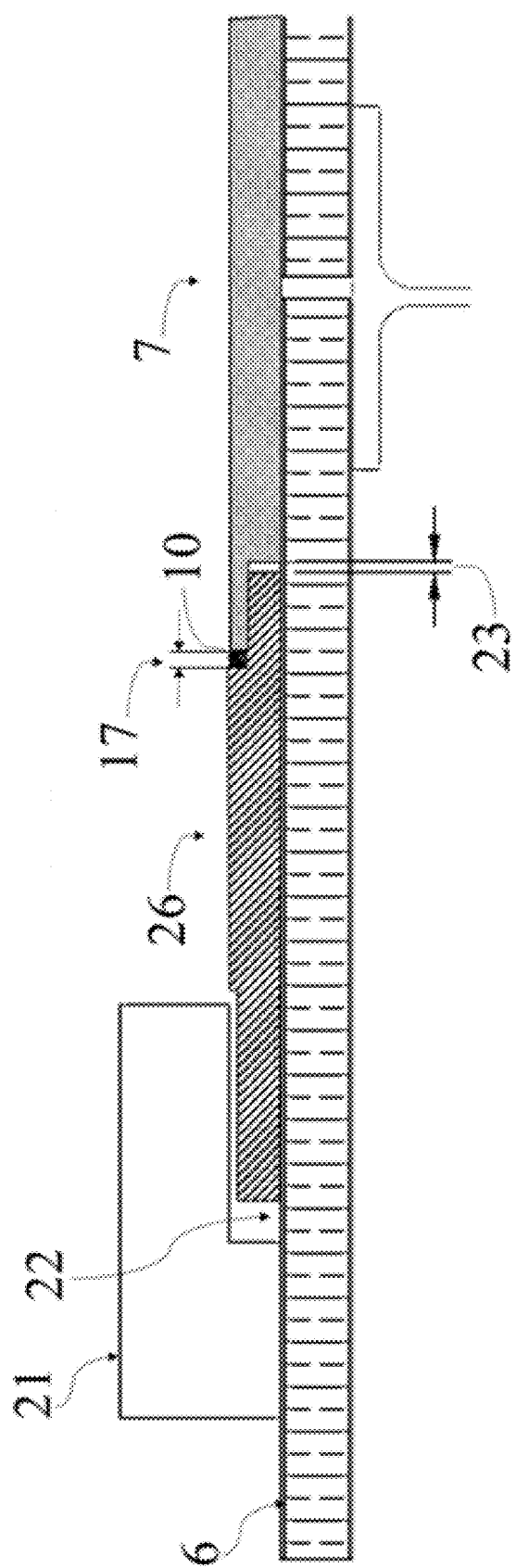
FIG. 4 corresponds to an illustrative section view showing a flooring panel and a spacer panel connected to a monument of an aircraft, wherein the spacer panel forms a gap and a separation with the flooring panel, according to aspects of this disclosure.
Figure 5A:
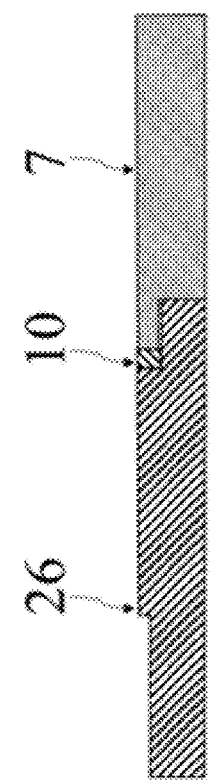
FIGS. 5A-D shows a plurality of section views showing a cross section of cut sections of flooring panels and a corresponding shape of the spacer panel, according to aspects of this disclosure.
Figure 5B:
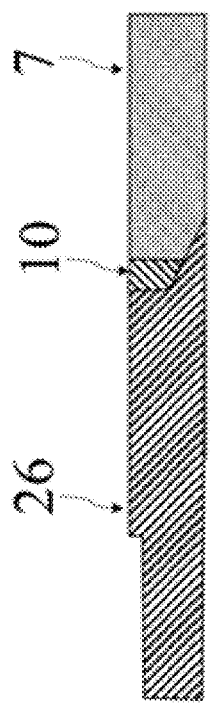
Figure 5C:
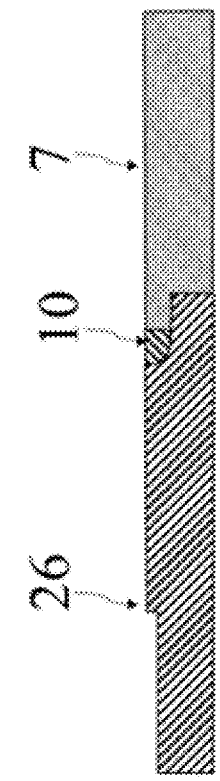
Figure 5D:
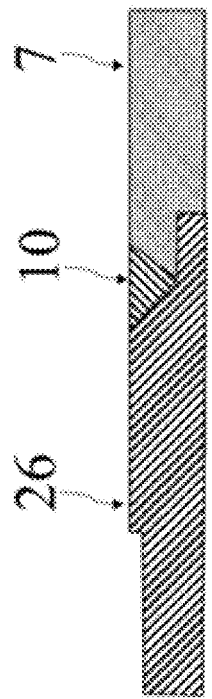

In some cases, referring to FIG. 4, the spacer panel 26 and the flooring panel 7 may form a gap 17. The gap 17 may be filled with a sealant member 10 that seals the gap 17 and prevents infiltrations of liquids spilled over the flooring panel 7 and/or the spacer panel 26 and that could reach the structural floor 6 of the aircraft. These infiltrations of liquid could cause damages in electric and/or electronic instruments and may increase corrosion risk to the aircraft. Additionally, the sealant member 10 may provide an elastic connection between the flooring panels 7 that may additionally provide bending and/or shear resistance to the aircraft flooring.

Similarly, and making reference to FIG. 4, the spacer panel 26 and the flooring panel 7 may form a separation 23. This separation 23 may provide a tolerance between the spacer panel 26 and the flooring panel 7, which allows the flooring panel 7 a lateral displacement relative to the spacer panel 26 produced by forces due to pressurization of the aircraft, to flying maneuvers, or dynamic loads such as inertia, vibration, slosh dynamics of fluids, and/or to ground loads due to adverse braking or maneuvering during taxiing.

In some cases, the sealant member 10 may be selected from available sealants, such as, for example a sealant member selected from the group including grouts of polyvinyl chloride, extruded polyvinyl chloride, extruded polymers, thermoplastic resins, epoxy resins, silicone, elastomeric gaskets, and combinations thereof. Also, the sealant member 10 may be made of one or more different materials, such as a material selected from natural rubber, polyisoprene, polybutadiene, styrene-butadiene rubber, butyl rubber, or nitrile rubber.

For example, the sealant member 10 can be a grout, where the grout is applied between the flooring panel 7 and the spacer panel 26). The grout may be a polymeric material, which can be applied between the flooring panel 7 and the spacer panel 26 when installing the flooring panels and/or the spacer panels to the structural floor 6. The grout allows filling discontinuities, cracks, scratches or other superficial defects located on the flooring panel 7 or the spacer panel 26. Accordingly, the grout may provide an effective seal that avoids infiltrations of liquids in the interlayers of the flooring panel 7 and/or the spacer panel 26 when they are formed by laminated layers.

The gap 17 may have a distance in a range, such as a range between 0 mm to 4.572 mm, between 1.143 mm to 4.572 mm, between 2.286 mm to 4.572 mm, between 1 mm and 5 mm, between 1 mm and 2 mm, between 1.2 mm and 1.5 mm, between 1.25 mm and 1.5 mm, between 1.1 mm and 1.7 mm, between 1.25 mm and 1.75 mm, between 1.3 mm and 1.75 mm, between 1.5 mm and 1.8 mm, between 1.2 mm and 2.5 mm, between 2 mm and 2.5 mm, between 2.2 mm and 2.5 mm, between 2.286 mm and 2.5 mm, between 2.5 mm and 3 mm, between 2 mm and 3.5 mm, or having a distance of more than 3.5 mm.

Similarly, the cut section 16 of the flooring panel 7 may extend inwardly from the edge contiguous to the spacer panel 26 a distance in a range between 6.35 mm and 25.4 mm, between 6.35 mm and 25.4 mm, between 8 mm and 10 mm, between 8 mm and 9 mm, between 10 mm and 13 mm, between 10 mm and 12.5 mm, between 10 mm and 15 mm, between 12.5 mm and 15 mm, between 12.5 mm and 19 mm, between 12.5 mm and 25.4 mm, between 12.5 mm and 30 mm, between 19 mm and 25.4 mm, between 25 mm and 35 mm, or having a distance of more than 35 mm.

Similarly, the spacer panel 26 and the flooring panel 7 may have the same thickness or a thickness that is substantially the same. For example, the spacer panel 26 and the flooring panel 7 may have a thickness between 10 mm and 20 mm, or other such range of thicknesses.

Figure 7:
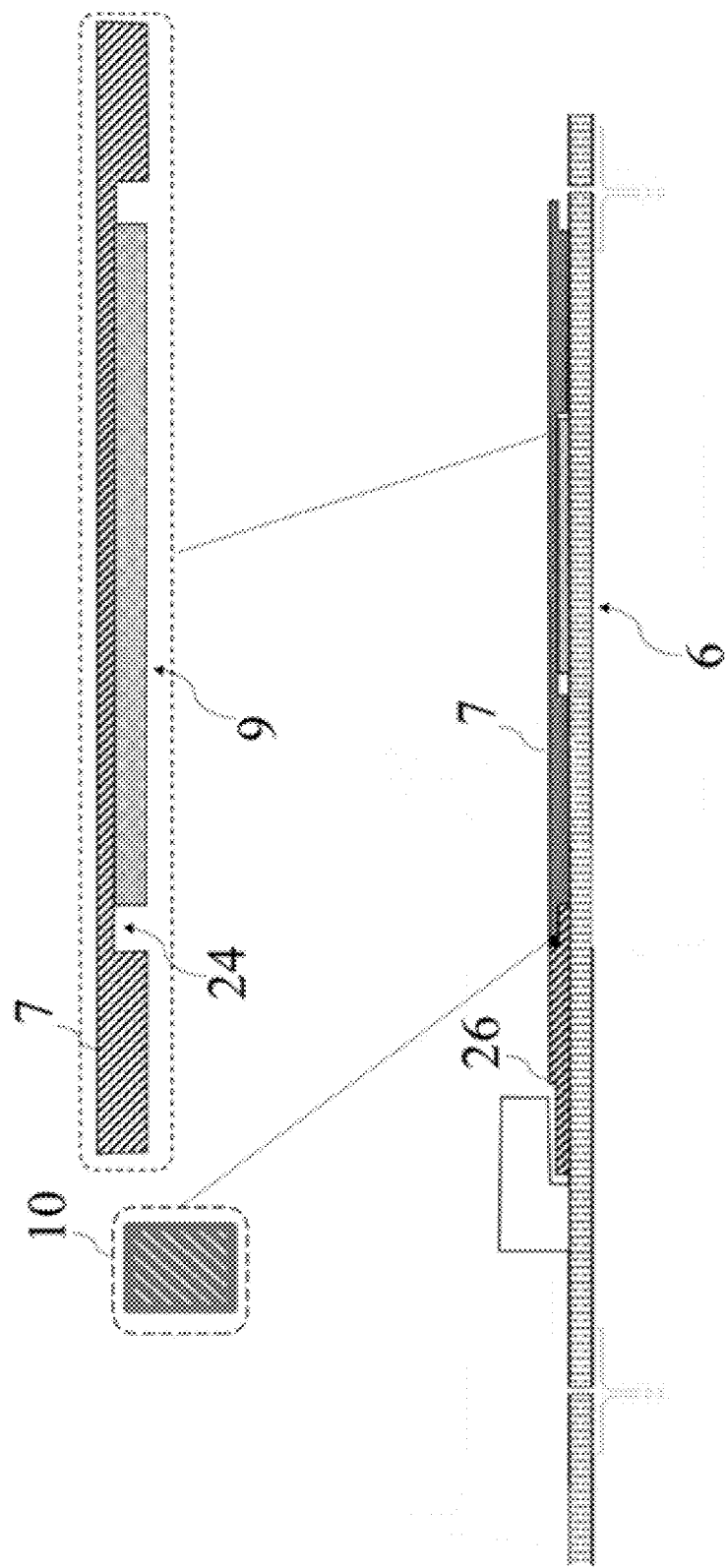
FIG. 7 corresponds to an illustrative section view showing a sealant member and a spacer panel and a flooring panel with an attached floor puck, according to aspects of this disclosure.

In some cases, referring to FIG. 7, the flooring panel 7 may include a panel housing 24, which may be connected to a floor puck 9, where the floor puck 9 may be attached to the structural floor 6 of the aircraft by adhesive means or fasteners.

For example, the floor puck 9 may be a floor puck such as the one described in the co-pending U.S. patent application Ser. No. 16/590,038. Accordingly, the floor puck 9 may provide a floating connection between the flooring panel 7 and the structural floor 6.

Figure 8:
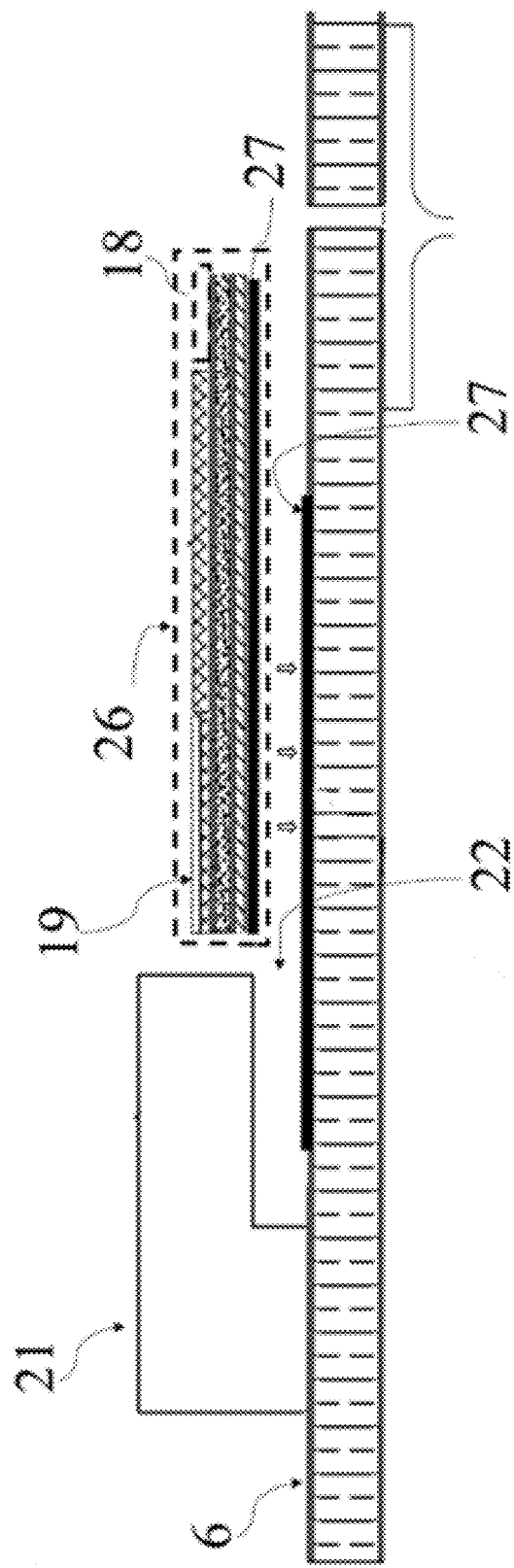
FIG. 8 corresponds to an illustrative section view showing an exploded detail view of a spacer panel connected by magnetic tapes to a structural floor of an aircraft, according to aspects of this disclosure.

Making reference to FIG. 8 and in an illustrative example, the spacer panel 26 may be formed by a plurality of layers laminated together. For example, the spacer panel 26 can be formed using a composite architecture and/or materials similar to those of each flooring panel 7 and as illustrated in co-pending U.S. patent application Ser. No. 16/590,038.

The spacer panel 26 and/or the flooring panel 7 may include a plurality if layers, such as a top layer, a core layer, and bottom layer. In some cases, the top layer may be made of a durable material, such as a material selected from a group including aramid fiber composites, carbon fiber composites, fiberglass composites, thermoplastic elastomers, EPDM, polyamides (PA) (e.g. PA12, PA6, PA66), polyetheretherketone (PEEK), thermosetting polyimides, polyamide-imide (PAI), polychlorotrifluoroethylene (PCTFE), polytetrafluoroethylene (PTFE), polymethylmethacrylate (PMMA), polyvinyl chloride (PVC), chlorinated polyvinyl chloride (CPVC), vinylidene polyfluoride (PVDF), ethylene-chlorotrifluoroethylene (ECTFE), cross-linked polyethylene (PEX) copolymers thereof, and/or combinations thereof. Similarly, the spacer panel 26 and/or the flooring panel 7 may be manufactured from a material selected from the group including bamboo, cork, hardwood, laminated wood, engineered wood, plywood, and combinations thereof.

Similarly, the spacer panel 26 and/or the flooring panel 7 may include a core layer made of a material with stiffening properties and/or light weight properties, such as a material selected from the group comprising non-woven polyester textiles, non-woven polyester textiles including microbeads and perforations (e.g. Coremat®, VitelMat®), pressure stable polyester non-woven textiles having channels (e.g. Soric®), polyethylene foams, polyvinyl chloride (PVC) foams, polymethacrylimide foams, honeycomb core materials (e.g. aluminum, nomex), and combinations thereof. These illustrative materials, and other similar materials, may provide improved stiffness to the flooring panel 7 and/or the spacer panel 26 at least because they make each panel thicker without adding a significant weight, particularly in comparison with the material of the top layer. Accordingly, a thicker flooring panel 7 and/or spacer panel 26 may have a greater moment of inertia, hence a greater stiffness.

Additionally, the spacer panel 26 and/or the flooring panel 7 may include durable bottom layer, such as a bottom layer made of one or more materials such as, for example, aramid fiber composites, carbon fiber composites, fiberglass composites, thermoplastic elastomers, EPDM, polyamides (PA) (e.g. PA12, PA6, PA66), polyetheretherketone (PEEK), thermosetting polyimides, polyamide-imide (PAI), polychlorotrifluoroethylene (PCTFE), polytetrafluoroethylene (PTFE), polymethylmethacrylate (PMMA), polyvinyl chloride (PVC), chlorinated polyvinyl chloride (CPVC), vinylidene polyfluoride (PVDF), ethylene-chlorotrifluoroethylene (ECTFE), cross-linked polyethylene (PEX) copolymers thereof, and/or combinations thereof.

For example, the spacer panel 26 and/or the flooring panel 7 may include a bottom layer and/or a top layer made of a fiber reinforced laminate such as a laminated of aramid fibers bonded together with epoxy resin, carbon fibers bonded together with epoxy resin, or fiberglass fibers bonded together with polymeric resins (e.g. unsaturated polyester resins, saturated polyester resins, orthoftalic polyester resins, isophthalic polyester resins, vinyl ester resins, urethane-acrylic resins). In some cases, the fibers can be provided in mats (e.g. woven mats, stitch-bonded mats, agglutinant bonded mats) or may be provided as cut fibers.

The fiber reinforced laminates may be manufactured by one or more different manufacturing methods, such as hand layup, resin transfer molding (RTM), vacuum-assisted resin transfer molding (VARTM), spray-up, vacuum infusion processing, closed cavity bag molding (CCBM), autoclave processing, compression molding, pultrusion, or combinations thereof.

The fiber reinforced laminates may be selected for aeronautic applications because the fiber reinforced laminates may provide a high relation of resistance/weight in comparison with metal panels or solid polymer panels.

For example, during the manufacturing process of the flooring panel 7 and/or of the spacer panel 26, the top layer and the bottom layer form a laminated sandwich with the core layer in between. The laminated sandwich can be formed by one or more different processes such as RTM, vacuum infusion processing, and autoclave processing. In such cases, suitable core layer materials may be selected, such as pressure stable polyester non-woven textiles having channels (e.g. Soric®), polyethylene foams, polyvinyl chloride (PVC) foams, and polymethacrylimide foams. These materials may allow an even flow of resins (e.g. polyester, vinyl ester, acrylic, epoxy, etc.) inside closed molds to distribute the resins along the core layer such as to cover reinforcement materials, such as aramid, carbon or glass fibers.

In some cases, the bottom layer of the flooring panel 7 and/or the bottom layer of the spacer panel 26 may be made of an off-the-shelf elastomeric-thermoplastic acoustic dampening barrier roll goods type panel. For example, this type of bottom layer provides acoustical and/or vibration isolation. Additionally, the top layer of flooring panel 7 and/or the top layer of the spacer panel 26 may be made with real organic products and/or engineered products having the appearance of one or more of bamboo, cork, hardwood, laminated wood, engineered wood, plywood, and combinations thereof.

In some cases, materials, structures, and/or products may be installed in other applications, places, or vehicles such as, for example, in pressurized rooms, pressurized vessels, submarines, spaceships, helicopters, boats, ships, and other places or vehicles submitted to compression and de-compression, pressurization or forces generated by high speeds and accelerations (G-forces).

EXAMPLES

Example 1

Making reference to FIG. 7, a plurality of the spacer panels 26 is installed in the periphery of an interior space of a vehicle, such as an aircraft cabin. Each spacer panel 26 is connected to the structural floor 6 of the vehicle by a magnetic tape 27 that may be disposed in strips along a longitudinal direction of the spacer panel 26. Each strip may have a width of about 12.5 mm and a length between 685.8 mm and 539.75 mm.

In an illustrative example, referring to FIG. 3, each spacer panel 26 has a second cut section 18 with a length of about 13.46 mm and each flooring panel 7 has a cut section 16 having a length of about 12.5 mm. Accordingly, the spacer panel 26 and the flooring panel 7 may form a gap 17 of about 0.76 mm. In the gap 17, a sealant member 10 may be applied, such as) an extruded PVC grout.

Additionally, the spacer panels 26 and the flooring panels 7 are bonded together with an adhesive material 8, such as a butyl rubber tape having adhesive on both faces.

It should be understood that the present invention is not limited to the illustrative examples described and illustrated, as it will be evident to a person skilled in the art that there are variations and possible modifications that do not depart from the spirit of the disclosure.

What is claimed is:

1. A magnetic perimeter attachment system for an aircraft flooring section, comprising:
a magnetic tape attached to a structural floor of an aircraft and near a monument adjacent to an edge of the structural floor; and
a spacer panel laterally adjacent to the monument and to a flooring panel of an aircraft flooring section, wherein the spacer panel is magnetically coupled to the magnetic tape, wherein the spacer panel provides a magnetic connection between the flooring section and the structural floor and wherein the spacer panel is located on the perimeter of the aircraft flooring section.

2. The magnetic perimeter attachment system of claim 1, wherein the magnetic tape comprises:
a carrier layer having, on one side, an acrylic or rubber adhesive which is bonded to the structural floor of the aircraft; and
a magnetic material deposited on the opposite side of the carrier layer.

3. The magnetic perimeter attachment system of claim 1, wherein the spacer panel includes a complementary magnetic tape attached to its bottom face, wherein the complementary magnetic tape is magnetically coupled to the magnetic tape attached to the structural floor of the aircraft.

4. The magnetic perimeter attachment system of claim 1, wherein the spacer panel includes an embedded magnetic material to be magnetically coupled to the magnetic tape attached to the structural floor of the aircraft.

5. The magnetic perimeter attachment system of claim 1, wherein the spacer panel includes a magnetic coating applied to a lower face of the spacer panel, wherein the magnetic coating is to be magnetically coupled to the magnetic tape attached to the structural floor of the aircraft.

6. The magnetic perimeter attachment system of claim 1, wherein the spacer panel includes, in an upper face and on an edge contiguous to a structural monument located on the perimeter of the aircraft flooring section, a first cut section that allows the spacer panel to be inserted into a recessed cavity of the structural monument.

7. The magnetic perimeter attachment system of claim 6, wherein the upper face of the spacer panel includes:
a second cut section located on an edge contiguous to a flooring panel, wherein the second cut section is connected to the flooring panel by an adhesive material.

8. The magnetic perimeter attachment system of claim 7, wherein the adhesive material comprises one or more of a silicone adhesive, a polymer adhesive, an acrylonitrile, an acrylic adhesive, a cyanoacrylate, an epoxy resin, an epoxy putty, an ethylene-vinyl acetate (EVA), a polyvinyl butyral (PVB), a polyvinyl acetate (PVA), a polyester resin, a polysulfide, a polyurethane, a polyvinyl alcohol, a polyvinyl chloride (PVC), a polyurethane tape, a butyl rubber tape, a neoprene adhesive, or a urethane adhesive.

9. The magnetic perimeter attachment system of claim 7, wherein the first cut section and the second cut section are a same shape.

10. The magnetic perimeter attachment system of claim 7, wherein the first cut section and the second cut section are a different shape.

11. The magnetic perimeter attachment system of claim 1, wherein the spacer panel is positioned laterally adjacent to the flooring panel.

12. The magnetic perimeter attachment system of claim 1, wherein the flooring section comprises at least one floating attachment points that allow for horizontal displacement of the floor panel caused by a movement of the aircraft.

\* \* \* \* \*